US010227480B2

(12) United States Patent
Galizio et al.

(10) Patent No.: US 10,227,480 B2
(45) Date of Patent: *Mar. 12, 2019

(54) RUBBER COMPOSITIONS CONTAINING WHEY PROTEIN

(71) Applicant: Bridgestone Americas Tire Operations, LLC, Nashville, TN (US)

(72) Inventors: Benjamin C. Galizio, Kent, OH (US); Amy M. Randall, Akron, OH (US); Melissa Clark, Woodland Park, CO (US)

(73) Assignee: Bridgestone Americas Tire Operations, Inc., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,709

(22) Filed: Jun. 11, 2015

(65) Prior Publication Data

US 2016/0177070 A1  Jun. 23, 2016

Related U.S. Application Data

(60) Provisional application No. 62/093,608, filed on Dec. 18, 2014, provisional application No. 62/093,610, filed on Dec. 18, 2014.

(51) Int. Cl.

| C08L 9/00 | (2006.01) |
|---|---|
| C08L 7/00 | (2006.01) |
| C08L 89/00 | (2006.01) |
| C08K 3/22 | (2006.01) |

(52) U.S. Cl.
CPC ...... *C08L 9/00* (2013.01); *C08L 7/00* (2013.01); *C08L 89/00* (2013.01); *C08K 2003/2241* (2013.01)

(58) Field of Classification Search
CPC .............. C08L 9/00; C08L 7/00; C08L 89/00
See application file for complete search history.

(56) References Cited

U.S. PATENT DOCUMENTS

| 2,098,037 A | 11/1937 | Hazell et al. |
|---|---|---|
| 2,098,038 A | 11/1937 | Hazell et al. |
| 2,127,560 A | 8/1938 | Haslam |
| 2,931,845 A | 4/1960 | Rene et al. |
| 3,113,605 A | 12/1963 | Feutterer |
| 5,272,190 A | 12/1993 | Haruki et al. |
| 5,302,636 A | 4/1994 | Hiroshi et al. |
| 6,780,925 B2 | 8/2004 | Materne et al. |
| 6,835,769 B2 | 12/2004 | Custodero et al. |
| 2002/0004549 A1 | 1/2002 | Custodero et al. |
| 2003/0100643 A1 | 5/2003 | Kikuchi |
| 2003/0135006 A1 | 7/2003 | Thierry et al. |
| 2004/0030028 A1 | 2/2004 | Resendes et al. |
| 2005/0075422 A1 | 4/2005 | Resendes et al. |
| 2005/0085582 A1 | 4/2005 | Galimberti et al. |
| 2005/0277712 A1 | 12/2005 | Daly |
| 2006/0252879 A1 | 11/2006 | Yasuyuki et al. |
| 2008/0108733 A1 | 5/2008 | Howard et al. |
| 2008/0236716 A1 | 10/2008 | Bergman et al. |
| 2009/0232876 A1 | 9/2009 | Montes et al. |
| 2012/0183794 A1 | 7/2012 | Guo et al. |
| 2013/0150498 A1 | 6/2013 | Basu et al. |
| 2013/0263520 A1 | 10/2013 | Houga et al. |
| 2013/0312890 A1* | 11/2013 | Iwata ................ B60C 5/14 152/516 |
| 2015/0159001 A1* | 6/2015 | Qu ................ C08L 7/02 525/132 |

FOREIGN PATENT DOCUMENTS

| CN | 101240049 A | 8/2008 | |
|---|---|---|---|
| CN | 101967239 A | 2/2011 | |
| CN | 103772532 A | 5/2014 | |
| DE | 19622169 A1 | 12/1996 | |
| EP | 1234852 A1 | 6/2013 | |
| EP | 2604651 A1 | 6/2013 | |
| GB | 754939 A | 8/1956 | |
| GB | 766509 A | 1/1957 | |
| JP | S58-087141 A | 5/1983 | |
| JP | H06-166771 A | 6/1994 | |
| JP | 2000038477 A * | 2/2000 | |
| JP | 2002-249987 A | 9/2002 | |
| JP | 2009-029991 A | 9/2009 | |
| JP | 2014-062269 A | 4/2014 | |
| WO | WO 03037655 A1 * | 5/2003 | ............ B60C 1/00 |
| WO | 2010016466 A1 | 2/2010 | |
| WO | 2013023229 A1 | 2/2013 | |
| WO | 2013081138 A1 | 6/2013 | |
| WO | 2013092095 A1 | 6/2013 | |
| WO | 2014036578 A1 | 3/2014 | |

OTHER PUBLICATIONS

English Abstract of JP2000038477A, Takako, 2000, Espacenet, downloaded May 23, 2016.*
Sharma, Suraj, and Igor Luzinov. "Whey based binary bioplastics." Journal of Food Engineering 119.3 (2013): 404-410.*
Goodall, S., et al. "Selective separation of the major whey proteins using ion exchange membranes." Journal of dairy science 91.1 (2008): 1-10.*
Hudson, H. M., C. R. Daubert, and E. A. Foegeding. "Rheological and physical properties of derivitized whey protein isolate powders." Journal of Agricultural and Food Chemistry 48.8 (2000): 3112-3119.*
Morr, C. V. "Whey utilization." Whey and lactose processing. Springer, Dordrecht, 1992. 133-155 (13 page excerpt).*
Alder-Nissen, Jens, "Determination of the Degree of Hydrolysis of Food Protein Hydrolysates by Trinitrobenzenesulfonic acid," J. Agric. Food Chem., vol. 27, No. 6, pp. 1256-1262 (1979).
Section 7.2 (Titanium Dioxide) from Basic Rubber Testing: Selecting Methods for a Rubber Test Program, editor John S. Dick, 2003.
Etzel, Mark R., "Manufacture and Use of Dairy Protein Fractions," J. of Nutrition, vol. 134, No. 4, pp. 996S-1002S (2004).
Fitzgerald, Richard J. et al., "Hypotensive Peptides from Milk Proteins," J. of Nutrition, vol. 134, No. 4, pp. 980S-998S (2004).

(Continued)

Primary Examiner — Nicholas E Hill
(74) Attorney, Agent, or Firm — Meredith E. Hooker; Jenny Sheaffer

(57) ABSTRACT

Disclosed herein are rubber compositions comprising at least one rubber, titanium oxide filler and a whey protein component, and related methods as well as tire components containing the rubber compositions disclosed herein.

22 Claims, No Drawings

(56) References Cited

OTHER PUBLICATIONS

GNC Pro Performance 100% Whey Protein—Vanilla Cream, downloaded Jun. 10, 2014.
Hoogwegt U.S. Inc., Acid Whey Protein, downloaded Jun. 25, 2014 (1 page).
Hoogwegt U.S. Inc., Reduced Lactose Whey Protein, downloaded Jun. 25, 2014 (1 page).
Hoogwegt U.S. Inc., Reduced Minerals Whey Protein, downloaded Jun. 25, 2014 (1 page).
Hoogwegt U.S. Inc., Sweet Whey Powder, downloaded Jun. 25, 2014 (1 page).
Hoogwegt U.S. Inc., Whey Protein Concentrate, downloaded Jun. 25, 2014 (1 page).
Hoogwegt U.S., Inc., Whey Protein Isolate, downloaded Jun. 25, 2014 (1 page).
Jong, L., "Effect of Soy Protein Concentrate in Elastomer Composites," Composites Part A: Applied Science and Manufacturing, vol. 37, issue 3, Mar. 2006, pp. 438-446.
Jong, Lei, Characterization of Soy Protein/Styrene-Butadiene Rubber Composites, Composites Part A: Applied Science and Manufacturing, vol. 36, issue 5, May 2005, pp. 675-682.
Chapter 7 (title: Nonfood Applications of Milk Proteins: A Review), from Colloids in Biotechnology, by Kalicka et al., 2010.
Kronos 1000, titanium dioxide, copyright 2014.
Milk Facts, downloaded Jun. 9, 2014 (4 pages).
Burrington, Kimberlee (K.J.), Technical Report Milk Fractionation Technology and Emerging Milk Protein Opportunities, copyright 2013 (8 pages).
Morias et al., "Correlation between the Degree of Hydrolysis and the Peptide Profile of Whey Protein Concentrate Hydrolysates: Effect of the Enzyme Type and Reaction Time," Am. J. Food Tech., vol. 8, issue 1, pp. 1-16, 2013.
Sarkawi, S.S., et al., "The Influence of Non-Rubber Constituents on Performance of Silica Reinforced Natural Rubber Compounds," European Polymer Journal, vol. 48, issue 10, Oct. 2013, pp. 3199-3209.
Titanium Oxide, Wikipedia, downloaded Jun. 1, 2015 (2 pages).
International Search Report and Written Opinion from PCT application No. PCT/US2015/064509, dated Apr. 20, 2016 (12 pages).
International Search Report and Written Opinion from PCT application No. PCT/US2015/035258, dated Sep. 15, 2015 (11 pages).
International Search Report and Written Opinion from PCT application No. PCT/US2015/035255, dated Sep. 15, 2015 (12 pages).
International Search Report and Written Opinion from PCT application No. PCT/US2015/035264, dated Sep. 14, 2015 (10 pages).
Han, X.Q. et al., Journal of Agricultural and Food Chemistry, vol. 44, No. 5, pp. 1211-1217 (1996).
Vulcanization & Accelerators, Nocil Limited, Dec. 2010, downloaded from http://www.nocil.com/Downloadfile/DTechnicalNote-Vulcanization-Dec10.pdf.
International Preliminary Report on Patentability from PCT application No. PCT/US2015/064509, dated Jun. 20, 2017 (9 pages).
International Preliminary Report on Patentability from PCT application No. PCT/US2015/035258, dated Jun. 20, 2017 (8 pages).
International Preliminary Report on Patentability from PCT application No. PCT/US2015/035255, dated Jun. 21, 2017 (9 pages).
International Preliminary Report on Patentabilityfrom PCT application No. PCT/US2015/035264, dated Jun. 21, 2017 (7 pages).
Eastman Cellulose-Based Specialty Polymers, Oct. 2014 (32 pages).
International Institute of Synthetic Rubber Products, Inc., "Butyl Rubber", downloaded on Jun. 1, 2015 from https://iisrp.com/wp-content/uploads/02ButylRubberIIR16Aug2012.pdf (5 pages).
European Search Report and Opinion from EP application No. 15870496.5 with EP communication dated May 4, 2018.
Office action from U.S. Appl. No. 15/536,729 dated Jul. 2018.
Response filed in U.S. Appl. No. 15/536,729 dated Oct. 2018.
Office action from U.S. Appl. No. 15/537,043 dated Jul. 2018.
Response filed in U.S. Appl. No. 15/537,043 dated Oct. 2018.
Wikipedia, Whey Protein, Jun. 4, 2018 (3 pages).

* cited by examiner

RUBBER COMPOSITIONS CONTAINING WHEY PROTEIN

FIELD OF THE DISCLOSURE

The present disclosure relates to rubber compositions comprising at least one rubber, titanium oxide filler and a whey protein component, and to related methods. The present disclosure also relates to tire components containing the rubber compositions disclosed herein.

BACKGROUND

Rubber compositions for vehicles tires may make use of various fillers to impart desirable properties to the rubber composition. The rubber molecules and filler particles may interact through cross-linking. The amount of cross-linking must be controlled, however. Insufficient cross-linking can lead to a rubber composition having poor properties (e.g., abrasion resistance, hardness, etc.) and too much cross-linking can lead to a rubber composition being brittle and hard to process.

SUMMARY OF THE INVENTION

Disclosed herein are rubber compositions comprising at least one rubber, titanium oxide filler and a whey protein component, and related methods. Also disclosed are tire components containing the rubber compositions disclosed herein.

In a first embodiment, a rubber composition is disclosed which comprises (a) at least one rubber, (b) titanium oxide filler in an amount of about 5 to about 200 phr, and (c) a whey protein component in an amount sufficient to provide about 0.1 to about 10 phr whey protein.

In a second embodiment, a rubber composition that has been subjected to curing is disclosed. The rubber composition comprises: (a) at least one rubber, (b) titanium oxide filler in an amount of about 5 to about 200 phr, (c) whey protein in an amount of about 0.1 to about 10 phr; and (d) a cure package.

In a third embodiment, a method for modifying the cross-linking of a titanium oxide filler-containing rubber composition is disclosed. The method comprises incorporating ingredients comprising a whey protein component in an amount sufficient to provide about 0.1 to about 10 phr of whey protein, at least one rubber; and about 5 to about 200 phr of titanium oxide filler.

DETAILED DESCRIPTION

Disclosed herein are rubber compositions comprising at least one rubber, titanium oxide filler and a whey protein component, and related methods. Also disclosed are tire components containing the rubber compositions disclosed herein.

In a first embodiment, a rubber composition is disclosed which comprises (a) at least one rubber, (b) titanium oxide filler in an amount of about 5 to about 200 phr, and (c) a whey protein component in an amount sufficient to provide about 0.1 to about 10 phr whey protein.

In a second embodiment, a rubber composition that has been subjected to curing is disclosed. The rubber composition comprises: (a) at least one rubber, (b) titanium oxide filler in an amount of about 5 to about 200 phr, (c) whey protein in an amount of about 0.1 to about 10 phr; and (d) a cure package.

In a third embodiment, a method for modifying the cross-linking of a titanium oxide filler-containing rubber composition is disclosed. The method comprises incorporating ingredients comprising a whey protein component in an amount sufficient to provide about 0.1 to about 10 phr of whey protein, at least one rubber; and about 5 to about 200 phr of titanium oxide filler.

Definitions

The terminology as set forth herein is for description of the embodiments only and should not be construed as limiting the invention as a whole.

As used herein, the term "phr" means the parts by weight per hundred parts of rubber. If the rubber composition comprises more than one rubber, "phr" means the parts by weight per hundred parts of the sum of all rubbers.

As used herein, the term "polybutadiene" is used to indicate a polymer that is manufactured from cis-1,3-butadiene monomers. The term polybutadiene is also used interchangeably with the phrase "polybutadiene rubber" and the abbreviation "BR."

As used herein, the term "polyisoprene" means synthetic polyisoprene. In other words, the term is used to indicate a polymer that is manufactured from isoprene monomers, and should not be construed as including naturally occurring natural rubber (e.g., *Hevea* natural rubber, guayule-sourced natural rubber or dandelion-sourced natural rubber). The term polyisoprene is also used interchangeably with the phrase "polyisoprene rubber" and the abbreviation "IR."

As used herein, the term "styrene-butadiene rubber" or "SBR" means a copolymer manufactured from styrene and cis-1,3-butadiene monomers.

As used herein, the term "natural rubber" or "NR" means naturally occurring rubber such as can be harvested from sources such as *Hevea* rubber trees, and non-*Hevea* source (e.g., guayule shrubs, and dandelions (e.g., TKS)). In other words, the term "natural rubber" should not be construed as including polyisoprene.

As used herein, the term "whey protein component" means a component which contains whey protein, but which also may include other materials such as water, minerals, fats, carbohydrates, etc.

As used herein, the term "majority" means at least 51% by weight.

As used herein, the term "minority" means less than 50% by weight.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and sidewalls) containing the rubber compositions disclosed herein.

Whey Protein Component and Whey Protein

As discussed above, according to the first embodiment disclosed herein, the rubber composition comprises a whey protein component and according to the second and third embodiments disclosed herein, the rubber composition comprises whey protein. As discussed in more detail below, the whey protein component is the source of whey protein in the resulting rubber composition.

Whey protein and casein protein are two types of protein found in milk (i.e., milk from cows, goats, sheep, humans, or other mammals). Whey protein refers generally to a group of milk proteins that remain soluble when liquid milk is acidified to a pH of 4.6 or lower. Casein proteins are the milk proteins that coagulate at acidic pH to become cheese, yogurt, or another solidified or semi-solidified milk product. After the coagulated casein protein solids are removed from acidified milk, the remaining liquid is referred to as whey; the whey typically contains whey protein along with varying amounts of carbohydrates (e.g., lactose), fats, and minerals.

Whey protein is a collection of globular proteins, which includes proteins such as alpha-lactalbumin, beta-lactoglobulin, immunoglobulin, and bovine serum albumin; while whey protein comprises a collection of proteins, for ease of reference it is referred to herein as "whey protein" in the singular. The combination of alpha-lactalbumin and beta-lactoglobulin comprise the majority of the proteins in whey protein from cow's milk, comprising about 25% and 65%, respectively, by weight of the protein. Although whey protein may comprise very minor amounts of individual amino acids or short-chain protein oligomers, the majority (i.e., more than 50%, including more than 75%, more than 90%, or even more than 95%) of the protein chains in whey protein have a molecular weight greater than about 10 kDaltons (measured by a method such as gel electrophoresis). In certain embodiments of the first-third embodiments disclosed herein, the protein chains of the whey protein used in the rubber composition (or contained in the whey protein component) have a degree of hydrolysis that is less than about 50%. The degree of hydrolysis ("DH") is the percentage of peptide bonds cleaved when a protein is hydrolyzed to break the protein chain into shorter chains or individual amino acids. DH can be measured by any of several known methods, including pH stat measurement, trinitrobenzenesulfonic acid (TNBS) reaction, ortho-phthaldialdehyde (OPA) reaction, and formol titration. In certain embodiments of the first-third embodiments disclosed herein, the whey protein used in the rubber composition (or contained in the whey protein component) has a DH that is less than about 30%, including less than 30%, less than about 25%, less than 25%, less than about 20%, less than 20%, less than about 15%, less than 15%, less than about 10%, less than 10%, less than about 5%, less than 5%, less than about 3%, and less than 3%. In certain embodiments according to the first-third embodiments disclosed herein, the whey protein in the whey protein component meets at least one of the preceding attributes relating to DH.

All proteins are comprised of building blocks of amino acids. The protein chains of whey protein contain a relatively high percentage of branched-chain amino acids (BCAAs), particularly leucine. Due to the amino acid profile of whey protein, it contains significant amounts of sulfur, but essentially no phosphate (phosphorus). Thus, in certain embodiments, the whey protein component used in the rubber compositions or the whey protein contained in the rubber compositions according to the first-third embodiments can be described as phosphate (or phosphorus) free or essentially phosphate (or phosphorus) free. Casein protein, in contrast, has a different amino acid profile and comprises primarily alpha-caseins, beta-casein, and kappa-casein. Due to the amino acid profile of casein protein, it contains significant amounts of phosphate (phosphorus), but little sulfur.

Whey with a pH of about 5.1 or greater is called "sweet whey," and is a byproduct of hard cheese production. Sweet whey protein is commercially valuable for making ricotta cheese and as an animal feed or fertilizer. However, the whey that results from making soft cheese, cottage cheese, and yogurt typically has a pH less than 5.1. This so-called "acid whey" and the acid whey protein in it have traditionally had little commercial value.

When whey is first separated from milk, the whey is mostly water (e.g., greater than about 90% water by weight), but it also contains whey proteins, fats, carbohydrates (e.g., lactose), minerals (e.g., calcium), and other milk-based materials (e.g., cholesterol). Thus, for the purpose of this disclosure, whey may be considered a whey protein component. However, the high aqueous content of most whey and its relatively low protein content (generally less than 1%) makes its use as a whey protein component in the rubber compositions according to the first-third embodiments disclosed herein less preferred, although possible. To make a more practical whey protein component for use in the rubber compositions (or source of whey protein) according to the first-third embodiments disclosed herein, the whey may be processed to remove some or all of the water, increase the concentration of the whey proteins, remove non-protein materials, or combinations of the foregoing. Such processed forms of whey are commercially available and may be sold under names including acid whey powder, reduced lactose whey, reduced minerals whey, sweet whey powder, whey powder concentrate, and whey protein isolate. Accordingly, in certain embodiments of the first-third embodiments disclosed herein the whey protein component comprises (or the whey protein is sourced from) at least one of acid whey powder, reduced lactose whey, reduced minerals whey, sweet whey powder, whey protein concentrate, and whey protein isolate. In certain of the foregoing embodiments, the whey protein component (or whey protein) is sourced from cow's milk (due to the general prevalence of cow's milk), and in other embodiments it is sourced from a non-human animal.

In certain embodiments according to the first-third embodiments disclosed herein, the whey protein component (or source of the whey protein) comprises a powder (i.e., whey powder). Whey powder may be formed by drying liquid whey (i.e., acid whey or sweet whey) to a solid, scoopable powder (i.e., acid whey powder or sweet whey powder). Whey powder may still have some residual water in the composition, but is essentially a dry powder when used as a whey protein component. In certain embodiments according to the first-third embodiments disclosed herein, the whey protein component (or source of the whey protein) comprises acid whey powder, sweet whey powder, or a combination thereof. In certain such embodiments, the acid whey powder comprises about 10 to about 15% by weight (including 10 to 15% by weight) whey protein. In another embodiment of the first-third embodiments disclosed herein, the whey protein component (or source of the whey protein) comprises reduced lactose whey. Reduced lactose whey may be formed by treating liquid whey to remove some or all of the water and lactose to form reduced lactose whey. In certain embodiments of the first-third embodiments disclosed herein, the reduced lactose whey comprises about 15 to about 30% by weight (including 15 to 30% by weight) whey protein. In another embodiment of the first-third embodiments disclosed herein, the whey protein component (or source of the whey protein) comprises reduced minerals whey. Reduced minerals whey may be formed by treating liquid whey to remove some or all of the water and minerals (e.g., calcium) to form reduced minerals whey. In certain embodiments of the first-third embodiments disclosed herein, the reduced minerals whey comprises about 10 to about 15% by weight (including 10-15% by weight) whey protein. In another embodiment of the first-third embodiments disclosed herein, the whey protein component (or source of the whey protein) comprises whey protein concentrate (WPC). WPC may be formed by treating liquid whey to remove a significant portion of the water. WPC may still have other milk components (e.g., fats, lactose, minerals, etc.) present in significant amounts. In certain embodiments of the first-third embodiments disclosed herein, the WPC comprises about 30 to about 85% by weight (including 30 to 85% by weight) whey protein. In another embodiment of the first-third embodiments disclosed herein, the whey protein component (or source of the whey protein) comprises whey protein isolate (WPI). WPI may be formed by treating liquid whey to remove much of the water, fat, lactose, and other non-protein components. In certain embodiments of the first-third embodiments disclosed herein, the WPI comprises at least about 90% whey protein by weight.

As discussed above, in certain embodiments according to the first-third embodiments disclosed herein, the rubber composition comprises a whey protein component (or a source of whey protein) in an amount sufficient to provide about 0.1 to about 10 phr whey protein in the rubber composition. In certain such embodiments, the whey protein component is present in an amount sufficient to provide 0.1 to 10 phr (e.g., 0.1 phr, 0.2 phr, 0.25 phr, 0.3 phr, 0.4 phr, 0.5 phr, 1 phr, 2 phr, 3 phr, 4 phr, 5 phr, 6 phr, 7 phr, 8 phr, 9 phr, 10 phr) of whey protein in the rubber composition, including about 0.2 to about 9 phr, including 0.2 to 9 phr, including about 0.25 to about 8 phr, including 0.25 phr to 8 phr, including about 0.3 to about 7 phr, including 0.3 to 7 phr, including about 0.4 to about 6 phr, including 0.4 to 6 phr, including about 0.5 to about 5 phr, and including 0.5 to 5 phr whey protein in the rubber composition. The amount of whey protein component needed to provide the foregoing amounts of whey protein will vary depending upon the concentration of whey protein in the respective whey protein component.

As discussed above, in certain embodiments according to the first-third embodiments disclosed herein, sources for the whey protein component used in the rubber composition (and, accordingly, the whey protein contained in the rubber composition) include manufacturers of acid whey-based dairy products, such as producers of Greek yogurt, cottage cheese, and other soft cheeses. In certain embodiments of the first-third embodiments disclosed herein, sources for the whey protein component used in the rubber composition (and, accordingly, the whey protein contained in the rubber composition) include commercial whey protein products, including but not limited to acid whey powder, sweet whey powder, reduced lactose whey, reduced minerals whey, WPC, WPI, and combinations thereof.

Polymers (Rubbers)

As discussed above, according to the first-third embodiments disclosed herein, the rubber composition comprises at least one rubber. These rubber compositions can be understood as comprising 100 parts of rubber (100 phr), which includes at least one rubber. The at least one rubber can be selected from natural rubber, synthetic rubber, or combinations thereof. Suitable rubbers for use in the rubber composition are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, and tetrafluoroethylene-propylene rubber.

In certain embodiments of the first-third embodiments disclosed herein, at least a majority (by weight) of the at least one rubber comprises at least one of: natural rubber, polyisoprene rubber, polybutadiene rubber, and styrene-butadiene rubber; in such embodiments, one or more than one type of any of the foregoing rubbers can be utilized. In certain embodiments, at least 60% by weight (at least 60 parts or phr), at least 70% by weight (at least 70 parts or phr), at least 80% by weight (at least 80 parts or phr), at least 90% by weight (at least 90 parts or phr), at least 95% by weight (at least 95 parts or phr), or even 100% by weight (100 parts or phr) of the rubber comprises at least one of: natural rubber, synthetic polyisoprene rubber, polybutadiene rubber, and styrene-butadiene rubber.

In certain embodiments of the first-third embodiments disclosed herein, a minority (by weight) of the at least one rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In certain embodiments, up to 40% by weight (up to 40 parts or phr), up to 30% by weight (up to 30 parts or phr), up to 20% by weight (up to 20 parts or phr), up to 10% by weight (up to 10 parts or phr), up to 5% by weight (up to 5 parts or phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In other embodiments, 0% by weight (0 parts or phr) of the rubber comprises styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber; in such embodiments, 100 parts or phr of the rubber comprises at least one of: natural rubber, synthetic polyisoprene rubber, polybutadiene rubber, and styrene-butadiene rubber. In yet other embodiments, up to 100% by weight (100 parts or phr), including up to 90% by weight (90 parts or phr), up to 80% by weight (80 parts or phr), up to 70% by weight (70 parts or phr) and up to 60% by weight (60 parts or phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber.

In certain embodiments of the first-third embodiments disclosed herein, the at least one rubber comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one rubber is utilized. In certain embodiments of the first-third embodiments disclosed herein, the at least one rubber includes at least one conjugated diene monomer-containing polymer or polymer. Examples of suitable conjugated diene monomers according to certain embodiments of the first-third embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments. Non-limiting examples of suitable polymers that are conjugated diene monomer-containing polymers or copolymers include, but are not limited to, styrene-butadiene rubber, polybutadiene, polyisoprene, styrene-isoprene rubber, styrene-butadiene-isoprene rubber, and natural rubber. In certain embodiments of the first-third embodiments disclosed herein, the at least one rubber is selected from styrene-butadiene rubber, polybutadiene, synthetic polyisoprene rubber, and natural rubber.

As discussed above, in certain embodiments according to the first-third embodiments, the at least one rubber comprises polybutadiene. In certain embodiments according to the first-third embodiments, the polybutadiene comprises a high cis polybutadiene. In certain embodiments according to the first-third embodiments, the high cis polybutadiene has a cis 1,4-bond content of 85% of greater, 90% or greater, 92% or greater, or 95% or greater. In certain embodiments of the first-third embodiments, the polybutadiene has a cis 1,4-bond content of 85-99%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments according to the first-third embodiments, the at least one rubber comprises polyisoprene. In certain embodiments according to the first-third embodiments, the polyisoprene comprises high cis polyisoprene. In certain embodiments according to the first-third embodiments, the high cis polyisoprene has a cis 1,4-bond content of 90% of greater. In certain embodiments of the first-third embodiments, the polyisoprene has a cis 1,4-bond content of 90% or greater, 92% or greater, or 95% or greater. In certain embodiments of the first-third embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprene, including polyisoprene having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,201; 7,008,899; 6,897,270; and 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, cis-1,2-, and trans-1,4-linkage contents in a given polymer such as polyisoprene can be determined by standard and well-established analytical methods such as infrared spectroscopy.

As discussed above, in certain embodiments according to the first-third embodiments, the at least one rubber comprises the copolymer styrene-butadiene rubber (SBR). SBR is a copolymer of styrene and butadiene monomers. In certain embodiments according to the first-third embodiments disclosed herein, the SBR used in the rubber composition comprises about 10 to about 50% styrene monomer and about 50 to about 90% butadiene monomer by weight. In certain embodiments according to the first-third embodiments disclosed herein, the SBR used in the rubber composition comprises 10 to 50% styrene monomer and 50 to 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubbers are well known, including sources for emulsion polymerized styrene-butadiene copolymer, functionalized versions of styrene-butadiene copolymer, neoprene, polybutadiene, synthetic polyisoprene rubber, and natural rubber.

In certain embodiments according to the first-third embodiments disclosed herein, the at least one rubber of the rubber composition comprises a functionalized polymer. In certain such embodiments, the rubber composition comprises about 5 to about 100 parts or phr of at least one functionalized polymer, including 5 to 100 parts or phr, about 10 to about 90 parts or phr, 10 to 90 parts or phr, about 10 to about 70 parts or phr, 10 to 70 parts or phr, about 10 to about 50 parts or phr, and 10 to 50 parts or phr. In certain embodiments according to the first-third embodiments disclosed herein, the functionalized polymer comprises a polymer with a carbon black-reactive functional group, a nitrogen-containing functional group, an oxygen-containing functional group, a sulfur-containing functional group, or a combination of the foregoing. Non-limiting examples of carbon black-reactive functional groups that are known to be utilized in functionalizing conjugated diene polymers and are suitable for use in the rubber compositions of certain embodiments of the first-third embodiments disclosed herein include nitrogen-containing functional groups, silicon-containing functional groups, oxygen or sulfur-containing functional groups, and metal-containing functional groups. As used herein, the term functionalized polymer should be understood to include rubber polymers and copolymers (including conjugated diene monomer-containing polymer or copolymer rubbers) with a functional group at one or both terminus (e.g., from use of a functionalized initiator, a functionalized terminator, or both), a functional group in the main chain of the polymer, and combinations thereof. For example, a silica-reactive functionalized polymer or copolymer may have the functional group at one or both terminus, in the main chain thereof, or both in the main chain and at one or both terminus.

Non-limiting examples of nitrogen-containing functional groups that are known to be utilized in functionalizing rubbers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-third embodiments disclosed herein, the rubber composition comprises a functionalized conjugated diene monomer-containing polymer or copolymer rubber having at least one functional group selected from the foregoing list.

Non-limiting examples of silicon-containing functional groups that are known to be utilized in functionalizing rubbers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments according to the first-third embodiments disclosed herein, the rubber composition comprises a functionalized conjugated diene monomer-containing polymer or copolymer rubber having at least one functional group selected from the foregoing list.

Non-limiting examples of oxygen or sulfur-containing functional groups that are known to be utilized in functionalizing diene rubbers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first-third embodiments disclosed herein, the rubber composition comprises a functionalized conjugated diene monomer-containing polymer or copolymer rubber having at least one functional group selected from the foregoing list.

Generally, rubbers, including conjugated diene monomer-containing polymer or copolymer rubbers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When rubbers, such as conjugated diene monomer-containing polymer or copolymer rubbers, are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

Methods for producing rubbers, such as conjugated diene monomer-containing polymer or copolymer rubbers, through anionic polymerization using an organic alkaline metal compound as the polymerization initiator are not particularly limited. For example, a conjugated diene monomer-containing polymer or copolymer rubber can be produced by polymerizing the conjugated diene monomer alone or a mixture of a conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

The anionic polymerization may be carried out in the presence of a randomizer. The randomizer can control the microstructure of the conjugated diene monomer-containing polymer or copolymer, and has an action that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Typically, in the rubber compositions according to the first-third embodiments disclosed herein, the overall composition contains 100 parts or phr (in total) of rubber(s). In other words, the total amount of all rubbers is considered to be 100 parts (by weight) and can also be denoted as 100 phr. Other components are added based upon 100 parts (in total) of rubber(s). As a non-limiting example, 60 parts of styrene-butadiene copolymer could be utilized along with 40 parts of polybutadiene polymer and 60 parts of carbon black; these amounts could be described herein as 60 phr of styrene-butadiene copolymer, 40 phr of polybutadiene polymer and 60 phr of carbon black.

Titanium Oxide Filler

As discussed above, according to the first-third embodiments disclosed herein, the rubber composition comprises about 5 to about 200 phr of titanium oxide filler. As used herein, the term "titanium oxide" should be understood to encompass compounds of titanium and oxide, including, but not limited to, titanium dioxide, compounds of titanium dioxide (i.e., hydrated forms of titanium dioxide), as well as titanium (II) oxide or titanium monoxide (TiO), titanium (III) oxide or dititanium trioxide ($Ti_2O_3$), trititanium oxide ($Ti_3O$), $Ti_2O$ (dititanium oxide), and titanium oxides of formula $Ti_nO_{2n-1}$ where n is an integer from 3-9 (e.g., $Ti_3O_5$, $Ti4O_7$, etc). In certain embodiments of the first-third embodiments the titanium oxide filler comprises titanium dioxide (including hydrated forms thereof). Titanium dioxide is an inert filler that is generally white in color and provides a desirable white color to certain rubber compositions in the absence of dark colored fillers such as carbon black (e.g., for white sidewall rubber compositions). Most titanium dioxide fillers can be considered reinforcing fillers (the terms reinforcing and non-reinforcing fillers are discussed in more detail below); however, in certain embodiments of the first-third embodiments disclosed herein a non-reinforcing titanium oxide filler (e.g., titanium dioxide filler) can be utilized, particularly when at least one reinforcing filler (e.g., carbon black, silica, or a combination thereof) is used in the rubber composition. There are generally understood to be two crystalline forms of titanium dioxide (anatase and rutile) and these may be present in varying amounts in the titanium dioxide fillers for use in the rubber compositions disclosed herein (a particular titanium dioxide filler may contain a combination of the two forms). Measurements of anatase and rutile crystalline forms of titanium dioxide may be performed using the X-ray diffraction techniques of ASTM D3720. Anatase titanium dioxide tends to be softer and chalks easily whereas rutile titanium dioxide tends to be harder and chalk resistant. Other titanium oxides may be highly colored (e.g., $Ti_2O3$ has a dark black to violet color).

Commercial sources of titanium oxide filler suitable for use in the rubber compositions of the first-third embodiments disclosed herein contain varying amounts of titanium oxide, generally at least about 75% by weight, including at least 75% by weight, at least about 80% by weight, at least 80% by weight, at least 85% by weight, at least 85%, at least about 90%, at least 90%, at least about 95%, and at least 95% by weight as well as about 85 to about 95% by weight, 85 to 95%, about 90 to 95% by weight, and 90 to 95% by weight; titanium oxides (particularly titanium dioxide) may also contain small amounts of aluminum oxide and silica oxides. In certain embodiments of the first-third embodiments, the titanium oxide filler includes at least one dispersing agent to aid in dispersion of the filler in the rubber composition. In certain embodiments of the first-third embodiments, the titanium oxide filler will have a pH of about 7 to about 8, including 7-8 (when suspended in an aqueous dispersion). In certain embodiments of the first-third embodiments disclosed herein, the titanium oxide filler has a surface area ($N_2SA$) of at least 20 $m^2/g$, including at least 50 $m^2/g$, at least 100 $m^2/g$, 20 to 400 $m^2/g$, 20 to 300 $m^2/g$, 20 to 200 $m^2/g$, 50 to 400 $m^2/g$, 50 to 300 $m^2/g$, 50 to 200 $m^2/g$, 100 to 400 $m^2/g$, 100 to 300 $m^2/g$, and 100 to 200 $m^2/g$. In certain embodiments of the first-third embodiments, the titanium oxide filler has an average particle size (by mass) of at least 10 nm, including at least 20 nm, at least 50 nm, at least 100 nm, 10 nm to 1000 nm, 10 nm to 500 nm, 10 nm to 400 nm, 10 nm to 300 nm, 20 nm to 1000 nm, 20 nm to 500 nm, 20 nm to 400 nm, or 20 nm to 300 nm. In certain embodiments of the first-third embodiments disclosed herein, the titanium oxide (e.g., titanium dioxide) has at least one of the foregoing properties. In certain embodiments of the first-third embodiments disclosed herein, the titanium oxide (e.g., titanium dioxide) is a non-reinforcing filler having a surface area ($N_2SA$) of less than 20 $m^2/g$, an average particle size (by mass) of greater than 1000 nm, or both.

Various commercial sources of titanium dioxide filler that are suitable for use in the rubber compositions of the first-third embodiments disclosed herein are available. Non-limiting examples include the titanium dioxides sold by Sachtleben Chemie GmbH of Duisburg, Germany (including R 405), various grades of titanium dioxide sold by DuPont under their tradename Ti-Pure®, titanium dioxides sold by Kronos, Inc. of Cranbury, N.J. under their tradename Kronos®, and various grades of titanium dioxide sold by Evonik Industries AG of Essen, Germany under their tradename Aeroxide®.

In certain embodiments of the first-third embodiments disclosed herein, the rubber composition comprises 5 to 200 phr (e.g., 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, 100 phr, 125 phr, 150 phr, 175 phr, or 200 phr) of a titanium oxide filler, including about 5 to about 175 phr, 5 to 175 phr, about 5 to about 150 phr, 5 to 150 phr, about 5 to about 100 phr, 5 to 100 phr, about 5 to about 90 phr, 5 to 90 phr, about 5 to about 80 phr, 5 to 80 phr, about 5 to about 75 phr, 5 to 75 phr, about 5 to about 50 phr, 5 to 50 phr, about 10 to about 200 phr, 10 to 200 phr, about 10 to about 175 phr, 10 to 175 phr, about 10 to about 150 phr, 10 to 150 phr, about 10 to about 100 phr, 10 to 100 phr, about 10 to about 90 phr, 10 to 90 phr, about 10 to about 80 phr, 10 to 80 phr, about 10 to about 75 phr, 10 to 75 phr, about 10 to about 50 phr, 10 to 50 phr, about 20 to about 200 phr, 20 to 200 phr, about 20 to about 175 phr, 20 to 175 phr, about 20 to about 150 phr, 20 to 150 phr, about 20 to about 100 phr, 20 to 100 phr, about 20 to about 90 phr, 20 to 90 phr, about 20 to about 80 phr, 20 to 80 phr, about 20 to about 75 phr, 20 to 75 phr, about 20 to about 50 phr, or 20 to 50 phr. The foregoing amounts should be understood to apply equally to those embodiments of the first-third embodiments wherein the titanium oxide filler comprises titanium dioxide.

Carbon Black Filler

In certain embodiments of the first-third embodiments disclosed herein, the rubber composition further comprises carbon black filler. When carbon black filler is utilized, the particular amount used may vary. In certain embodiments of the first-third embodiments disclosed herein, the rubber composition comprises carbon black in an amount of about 5 to about 200 phr (including 5 to 200 phr); in such embodiments one or more than one carbon black filler may be utilized. Generally any carbon black filler utilized in the rubber compositions of the first-third embodiments disclosed herein will be a reinforcing carbon black. One or more than one reinforcing carbon black filler may be utilized, in a total amount (i.e., when more than one carbon black filler is utilized their amounts are totaled together) of about 5 to about 200 phr (including 5 to 200 phr). As used herein, the term "reinforcing" with respect to "reinforcing carbon black filler," "reinforcing silica filler," and "reinforcing fillers" generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler and a reinforcing filler. In certain embodiments of the first-third embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-third embodiments disclosed herein, the term "reinforcing filler" is used to refer to a particulate material that has a particle size of about 10 nm up to about 1000 nm, including 10 nm up to 1000 nm, about 10 nm up to about 50 nm, and 10 nm up to 50 nm.

In certain embodiments of the first-third embodiments disclosed herein, the total amount of the reinforcing carbon black filler or carbon black filler is 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr. In certain embodiments, the useful upper range for the amount of reinforcing carbon black filler can be considered to be somewhat limited by the high viscosity imparted by fillers of this type; thus, in certain embodiments of the first-third embodiments, when reinforcing carbon black is utilized, the total amount of reinforcing filler (e.g., titanium oxide, carbon black, silica, other reinforcing filler, or combinations thereof) is no more than about 200 phr, including no more than 200 phr, no more than about 150 phr, or no more than 150 phr).

Suitable reinforcing carbon black fillers for use in the rubber composition of certain embodiments of the first-third embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including at least 35 $m^2/g$ to about 200 $m^2/g$ or higher). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the rubber composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Silica Filler

In certain embodiments of the first-third embodiments disclosed herein, the rubber composition further comprises one or more silica fillers, which are commonly understood to be reinforcing fillers. In other words, silica is not considered to be an essential component of the rubber compositions in all embodiments of the first-third embodiments disclosed herein. In those embodiments of the first-third embodiments, where the rubber composition includes one or more silica fillers, the total amount of reinforcing silica filler is about 5 to about 200 phr (including 5 to 200 phr). In certain embodiments of the first-third embodiments disclosed herein, the rubber composition comprises silica filler in an amount of from about 50% to about 99% by weight of the total reinforcing filler, including 50 to 99%, about 50% to about 95%, 50 to 95%, about 80% to about 95%, 80% to 95%, about 70% to about 90%, 70% to 90%, about 80% to about 90%, and 80% to 90% by weight of the total reinforcing filler. In certain embodiments of the first-third embodiments disclosed herein, the silica filler comprises no more than about 30% by weight of the total reinforcing filler in the rubber composition. In certain embodiments of the first-third embodiments disclosed herein, the rubber composition comprises about 5 to about 200 phr (including 5 to 200 phr) of one or more reinforcing silica fillers. Generally, examples of reinforcing silica fillers suitable for use in the rubber compositions of certain embodiments of the first-third embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the first-third embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™1165MP), and J. M. Huber Corporation.

In certain embodiments of the first-third embodiments disclosed herein, the total amount of the reinforcing silica filler or silica filler is about 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr. In certain embodiments, the useful upper range for the amount of reinforcing silica filler can be considered to be somewhat limited by the high viscosity imparted by fillers of this type; thus, in certain embodiments of the first-third embodiments, when reinforcing silica filler is utilized, the total amount of reinforcing filler (e.g., titanium oxide, carbon black, silica, other reinforcing filler, or combinations thereof) is no more than about 200 phr, including no more than 200 phr, no more than about 150 phr, or no more than 150 phr).

Other Fillers

In certain embodiments of the first-third embodiments, the rubber composition comprises at least one reinforcing filler other than carbon black or silica, or alternatively in addition to reinforcing carbon black and reinforcing silica fillers. Non-limiting examples of suitable such reinforcing fillers for use in the rubber compositions of certain embodiments of the first-third embodiments disclosed herein include, but are not limited to, aluminum hydroxide, talc, alumina ($Al_2O_3$), aluminum hydrate ($Al_2O_3H_2O$), aluminum hydroxide ($Al(OH)_3$), aluminum carbonate ($Al_2(CO_3)_2$), aluminum magnesium oxide ($MgOAl_2O_3$), pyrofilite ($Al_2O_34SiO_2.H_2O$), bentonite ($Al_2O_3.4SiO_2.2H_2O$), mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. When at least one reinforcing filler other than or alternatively in addition to reinforcing carbon black filler and reinforcing silica filler) is present, the total amount of all reinforcing fillers is about 5 to about 200 phr including 5 to 200 phr). In other words, when at least one reinforcing filler is present in addition to carbon black silica or both, the amount of any reinforcing carbon black filler and reinforcing silica filler is adjusted so that the total amount of reinforcing filler is about 5 to about 200 phr (including 5 to 200 phr).

In certain embodiments of the first-third embodiments, the rubber composition further comprises at least one non-reinforcing filler. In certain embodiments, the term "non-reinforcing filler " is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments of the compositions and methods disclosed herein, the term "non-reinforcing filler" is used to refer to a particulate material that has a particle size of greater than about 1000 nm (including less than 1000 nm). In certain embodiments of the first-third embodiments disclosed herein, the rubber composition further comprises at least one of the following non-reinforcing fillers: clay, graphite, magnesium dioxide, aluminum oxide, starch, boron nitride, silicon nitride, aluminum nitride, calcium silicate, and silicon carbide.

In certain embodiments of the first-third embodiments disclosed herein, the rubber composition comprises reinforcing titanium oxide filler, at least one reinforcing carbon black filler, at least one reinforcing silica filler, and at least one non-reinforcing filler, with the total amount of all reinforcing fillers being about 5 to about 200 phr (including 5 to 200 phr). In certain embodiments of the first-third embodiments disclosed herein, the rubber composition comprises reinforcing titanium oxide filler, at least one reinforcing carbon black filler, at least one reinforcing silica filler, at least one additional reinforcing filler, and at least one non-reinforcing filler, with the total amount of all reinforcing fillers being about 5 to about 200 phr (including 5 to 200 phr). In certain embodiments of the first-third embodiments disclosed herein, the rubber composition comprises reinforcing titanium oxide filler, at least one reinforcing carbon black filler, at least one reinforcing silica filler, and at least one non-reinforcing filler, with the total amount of all reinforcing fillers being about 5 to about 200 phr (including 5 to 200 phr). In certain embodiments of the first-third embodiments disclosed herein, the rubber composition comprises reinforcing titanium oxide filler, at least one reinforcing carbon black filler in an amount of about 5 to about 200 phr (including 5 to 200 phr), and at least one non-reinforcing filler. In certain embodiments of the first-third embodiments disclosed herein, the rubber composition comprises reinforcing titanium oxide filler, at least one reinforcing carbon black filler in an amount of about 5 to about 200 phr (including 5 to 200 phr), and at least one reinforcing filler other than carbon black or silica. In certain embodiments of the first-third embodiments disclosed herein, the rubber composition comprises titanium oxide filler, at least one reinforcing carbon black filler, and at least one reinforcing filler other than carbon black or silica, and at least one non-reinforcing filler, with the total amount of all reinforcing fillers being about 5 to about 200 phr (including 5 to 200 phr).

In certain embodiments of the first-third embodiments disclosed herein, the rubber composition comprises at least one white filler in addition to the titanium oxide filler. Non-limiting examples of white fillers suitable for use in the rubber compositions of the first-third embodiments include calcium carbonate, clay, talc, mica, wollastonite, diatomite, barite, silicate, and combination thereof. In certain embodiments of the first-third embodiments, the rubber compositions comprises at least one white filler (i.e., in addition to the titanium oxide filler) in a total amount of about 5 to about 200 phr, including 5 to 200 phr, about 5 to about 175 phr, 5 to 175 phr, about 5 to about 150 phr, 5 to 150 phr, about 5 to about 100 phr, 5 to 100 phr, about 10 to about 200 phr, 10 to 200 phr, about 10 to about 175 phr, 10 to 175 phr, about 10 to about 150 phr, 10 to 150 phr, about 10 to about 100 phr, 10 to 100 phr, about 20 to about 200 phr, 20 to 200 phr, about 20 to about 175 phr, 20 to 175 phr, about 20 to about 150 phr, 20 to 150 phr, about 20 to about 100 phr, or 20 to 100 phr (with the total amounts including the titanium oxide filler and any other white filler); non-limiting examples of such white fillers include calcium carbonate, clay, talc, mica, wollastonite, diatomite, barite, silicate, and combinations thereof. In certain embodiments of the first-third embodiments disclosed herein, the rubber composition is free of any carbon black filler. By free of any carbon black filler is meant less than 1 phr of carbon black, preferably 0 phr of carbon black. In certain embodiments of the first-third embodiments disclosed herein, the rubber composition comprises at least one white filler in addition to the titanium dioxide filler and is also free of any carbon black filler. Utilization of the titanium dioxide filler and whey protein in a rubber composition that is free of any carbon black can result in a white rubber composition; utilization of one or more additional white filler (as discussed above) will maintain the white color of the rubber composition. White rubber compositions according to the first-third embodiments disclosed herein may be utilized in various tire components such as sidewalls.

Other Ingredients

As discussed above, according to the third embodiment disclosed herein, the rubber composition comprises a cure package. In certain embodiments of the first and second embodiments disclosed herein, the rubber composition further comprises a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the first-third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker' s" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

In certain embodiments of the first-third embodiments disclosed herein, the rubber composition may optionally include one or more silane coupling agents. Silane coupling agents are particularly useful when the reinforcing filler comprises silica, in preventing or reducing aggregation of the silica filler in the rubber composition. Aggregates of the silica filler particles are believed to increase the viscosity of the rubber composition, and, therefore, preventing this aggregation reduces the viscosity and improves the processibility and blending of the rubber composition.

Generally, any conventional type of silane coupling agent can be used, such as those having a silane and a constituent component or moiety that can react with a polymer, particularly a vulcanizable polymer. The silane coupling agent acts as a connecting bridge between silica and the polymer. Suitable silane coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof.

Other ingredients that may be employed in the rubber compositions of certain embodiments of the first-third embodiments disclosed herein are well known to those of skill in the art and include oils (processing and extender), waxes, processing aids, tackifying resins, reinforcing resins, peptizers, and one or more additional rubbers.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, for most applications the total amount of oil used (processing oil and extender oil) in the rubber compositions and methods disclosed herein ranges from about 1 to about 70 phr, including 1 to 70 phr, about 2 to about 60 phr, 2 to 60 phr, about 3 to about 50 phr, and 3 to 50 phr. However, in certain applications, the total amount of oil used (processing oil and extender oil) in the rubber compositions and methods disclosed herein is much higher and ranges up to about 175 phr, including up to 175 phr, up to about 150 phr, up to 150 phr, up to about 100 phr, and up to 100 phr.

Various antioxidants are known to those of skill in the art and may be utilized in the rubber compositions of certain embodiments of the first-fourth embodiments; these include but are not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first-third embodiments. In certain embodiments of the first-third embodiments, the total amount of antioxidant(s) used is 0.1 to 6 phr.

Modifying Cross-Linking in Rubber Compositions

As discussed above, the third embodiment disclosed herein is a method for modifying the cross-linking of a titanium oxide filler-containing rubber composition. The method comprises incorporating about 0.1 to about 10 phr (including 0.1 to 10 phr) of whey protein (or a whey protein component in an amount sufficient to provide about 0.1 to about 10 phr of whey protein (including 0.1 to 10 phr)) into a rubber composition comprising at least one rubber, and about 5 to about 200 phr (including 5 to 200 phr) of a titanium oxide filler. In certain embodiments, the at least one rubber in the rubber composition is selected from styrene-butadiene copolymer, polybutadiene, polyisoprene, natural rubber, and combinations thereof. The cross-linking modification from the use of whey protein in combination with titanium oxide filler should also be understood to occur in the rubber compositions of the first and second embodiments disclosed herein.

Unexpectedly, it has been discovered that when whey protein is used in a rubber composition comprising titanium oxide filler, the cross-linking in the rubber composition is modified. The extent of cross-linking can be determined by measuring the rheometric torque required to mix the rubber composition during the curing step. Values for $M_L$ and $M_H$ (i.e., the lowest and highest torque, respectively, measured during the test) are determined, and the difference ($\Delta M$, i.e., $M_H - M_L$) indicates the degree of cross-linking. Modification of cross-linking in the rubber composition is demonstrated by a change in ΔM (i.e., $M_H$–$M_L$). The degree of cross-linking as evidenced by ΔM, has an effect on resulting final properties of the rubber composition such as rolling resistance and modulus. Thus, the ability to manipulate the degree of cross-linking or ΔM provides the benefit of being able to increase or decrease resulting final properties of the rubber composition.

In certain embodiments according to the first-third embodiment, the modification in cross-linking of the titanium oxide filler-containing rubber composition from the use of about 0.1 to about 10 phr of whey protein results in a decrease in ΔM (i.e., $M_H$–$M_L$) of at least about 10% (as compared to a rubber composition containing the same ingredients except for lacking any whey protein). In certain embodiments according to the first-third embodiment, the modification in cross-linking of the titanium oxide filler-containing rubber composition from the use of 0.1 to 10 phr of whey protein results in a change in ΔM (i.e., $M_H$–$M_L$) of at least 10% (as compared to a rubber composition containing the same ingredients except for lacking any whey protein). In certain embodiments according to the first-embodiment, the modification in cross-linking of the titanium oxide filler-containing rubber composition from the use of about 0.1 to about 10 phr of whey protein results in a change in ΔM (i.e., $M_H$–$M_L$) of at least about 15%, including at least about 20%, at least about 30%, at least about 40%, and at least about 50%. In certain embodiments according to the first-embodiment, the modification in cross-linking of the titanium oxide filler-containing rubber composition from the use of 0.1 to 10 phr of whey protein results in a change in ΔM (i.e., $M_H$–$M_L$) of at least 15%, including at least 20%, at least 30%, at least 40%, at least 50%, and at least 60%. In certain embodiments according to the first-embodiment, the modification in cross-linking of the titanium oxide filler-containing rubber composition from the use of about 0.1 to about 10 phr of whey protein results in a change in ΔM (i.e., $M_H$–$M_L$) of about 10% to about 60%, about 15% to about 55%, about 20% to about 50% and about 25% to about 45% (as compared to a rubber composition containing the same ingredients except for lacking any whey protein).

Methods for Preparing Rubber Compositions

Also disclosed herein are methods for preparing rubber compositions. The rubber compositions according to the first-third embodiments disclosed herein may generally be formed by mixing together the ingredients for the rubber composition (as disclosed above) by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. In certain embodiments of the compositions and methods disclosed herein, more than one non-productive master-batch mixing stage may be used. The term final productive mixing stage is also known to those of skill in the art and generally understood to be the mixing stage where the vulcanizing agents and vulcanization accelerators are added into the rubber composition.

In certain embodiments of the methods for preparing rubber compositions according to the first-third embodiments disclosed herein, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

In certain embodiments of the first-third embodiments disclosed herein, a rubber composition is prepared according to a method that includes at least one non-productive mixing stage and at least one productive mixture stage. In certain embodiments, the method for preparing the rubber compositions of the present disclosure includes: (1) mixing, in at least one non-productive master-batch stage, a rubber composition comprising: 100 phr of at least one rubber; from about 5 to about 200 phr (including 5 to 200 phr) of a titanium oxide filler; and a whey protein component in an amount sufficient to provide about 0.1 to about 10 phr (including 0.1 to 10 phr) whey protein; and (2) mixing the resulting product of the non-productive master batch in a final productive stage along with at least one curative, such as a curative package, as discussed above. With respect to certain embodiments of the first embodiment disclosed herein, the list of ingredients should be understood as including ingredients to be mixed to form the rubber composition. Accordingly, in such embodiments, the whey protein is added via a whey protein component which usually is not 100% whey protein. With respect to the certain embodiments of the second embodiment disclosed herein (i.e., a rubber composition that has been subjected to curing), the list of ingredients should be understood to comprise the ingredients present in the cured rubber composition such that the amount of whey protein can be measured without regard to its particular source (e.g., without regard to the particular whey protein component used to provide the whey protein).

In certain embodiments of the first-third embodiments disclosed herein, a rubber composition is prepared according to a method that includes at least one non-productive mixing stage and at least one productive mixing stage. In certain embodiments of the first-third embodiments disclosed herein, the method for preparing the rubber compositions of the present disclosure includes: (1) mixing, in at least one non-productive master-batch stage, a rubber composition comprising: 100 phr of at least one rubber; from about 5 to about 200 phr (including 5 to 200 phr) of a titanium oxide filler and a whey protein component in an amount sufficient to provide about 0.1 to about 10 phr (including 0.1 to 10 phr) whey protein; and (2) mixing the resulting product of the non-productive master batch in a final productive stage along with at least one curative, such as a cure package, as discussed above.

As previously discussed, certain embodiments disclosed herein include tires, tire treads, and tire sidewalls comprising a rubber composition of the first-third embodiments as otherwise disclosed herein, i.e., comprising at least one rubber, about 5 to about 200 phr (including 5 to 200 phr) of at least one titanium oxide filler, and a whey protein component in an amount sufficient to provide about 0.1 to about 10 phr (including 0.1 to 10 phr) whey protein (or when referring to a cured rubber composition, about 0.1 to about 10 phr of whey protein (including 0.1 to 10 phr). More specifically, the present disclosure includes a tire comprising a rubber composition of the first-third embodiments as otherwise disclosed herein, a tire comprising a tire tread comprising a rubber composition of the first-third embodiments as otherwise disclosed herein, a tire tread comprising a rubber composition of the first-third embodiments as otherwise disclosed herein, a tire comprising a tire sidewall comprising a rubber composition of the first-third embodiments as otherwise disclosed herein, and a tire sidewall comprising a rubber composition of the first-third embodiments as otherwise disclosed herein. Generally, when the rubber compositions of the first-third embodiments disclosed herein are utilized in tires, tire treads, or tire sidewalls, these compositions are processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization of a tire component is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In certain embodiments, pneumatic tires containing the rubber compositions as disclosed herein can be produced as discussed in U.S. Pat. Nos. 5,866,171, 5,876,527, 5,931,211, and 5,971,046, which are incorporated herein by reference.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the whey protein utilized in the examples (both type and amount) can be utilized with rubbers, fillers, and other ingredients which differ in amount, composition, or both from those used in the examples (i.e., as fully disclosed in the preceding paragraphs). Moreover, whey protein can be utilized in amounts and from sources that differ from those provided in the examples (i.e., as fully disclosed in the preceding paragraphs).

Examples 1 and 2

In Examples 1 and 2, rubber compositions containing titanium dioxide filler were prepared using a combination of natural rubber and polybutadiene (totaling 100 parts) for the rubber component. Example 1 utilizes 0 phr of whey protein and Example 2 utilizes 10 phr of whey protein component. The rubber compositions were prepared in a two stage mixing process (i.e., one masterbatch stage and a final batch stage) according to the formulations shown in Table 1A. The amount of each ingredient used is reported as parts per hundred rubber (phr). The mixing process used for these formulations is outlined in Table 1B below. The whey protein component utilized in Example 2 was acid whey (containing approximately 12 weight % protein).

TABLE 1A

Rubber Formulations For Examples 1 and 2

| | Sample # | |
|---|---|---|
| | 1 | 2 |
| Master-Batch #1 | | |
| Natural rubber | 80 | 80 |
| Polybutadiene[1] | 20 | 20 |
| Titanium dioxide[2] | 45 | 45 |
| Carbon Black[3] | 5 | 5 |
| Whey protein component (acid whey) | 0 | 10 |
| Whey protein (from WPC) | 0 | 1.2 |
| Processing oil | 10 | 10 |
| Antioxidant | 2.95 | 2.95 |
| Stearic acid | 2 | 2 |
| Final Batch | | |
| Vulcanization activator (Zinc oxide) | 2.5 | 2.5 |
| Vulcanizing agent (sulfur) | 1.5 | 1.5 |
| Vulcanization accelerators | 1.3 | 1.3 |

[1]High-cis polybutadiene (cis-bond content 96%)
[2]Kronos ® 1000, titanium dioxide particles obtained from Kronos, Inc. (oil absorption 20 grams/100 gram).
[3]N343 carbon black

TABLE 1B

Mixing Parameters

| Stage | Time | Condition |
|---|---|---|
| Master-Batch Stage (initial temp: 105° C., rotor rpm started at 60) | 0 sec 30 sec | Charge polymers Charge any oil, fillers (e.g., any carbon black and titanium dioxide) and other master-batch ingredients. Increase rotor to 75 rpm Drop based on max temperature of 330° F. (166° C.) |
| Final Batch Stage (initial temp: 80° C., rotor rpm at 40) | 0 sec 0 sec | Charge ingredients from Master-Batch Charge curatives Drop based on max temperature of 210° F. (99° C.) |

After curing, each of the rubber compositions was tested for tensile properties. The results for testing of the formulations of Examples 1 and 2 are shown in Table 1C below. The abbreviation Eb is used for elongation at break and Tb for stress at break, which measurements provide an indication of a rubber component's tear resistance, which is particularly relevant when it is incorporated into a tire tread. The abbreviation M300 is used for tensile stress at 300% elongation. The abbreviation E' is used for dynamic storage modulus, which provides a measure of the hardness of the rubber composition; steering stability on a dry road surface (dry performance) is generally impacted by E' with higher values preferred. The index values listed in Table 1C were determined by comparing the value for the formulation according to the present disclosure with the respective value for the control (i.e., dividing the test value by the control value).

Tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in the Tables below as engineering-stresses by reference to the original cross-sectional area of the test piece. The specimens were tested at 25° C. unless indicated to the contrary. Samples were cured for 15 minutes at 170° C.

The dynamic storage modulus (E') and tan δ values were measured with a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (as indicated in Table 1C below), sample shape: 4.75 mm wide×29 mm long×2.0 mm thick. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread.

The MH and ML values were measured using a moving die cure Monsanto rheometer MDR 2000 from Alpha Technologies at 160° C., following the guidelines of, but not restricted to, ASTM-D 2084. Measurements were in kg-cm prior to preparing index values. MH represents maximum torque and ML represents minimum torque.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes.

TABLE 1C

Testing Results for Rubber Formulations of Examples 1 and 2

| Property | 1 | 2 |
|---|---|---|
| Indexed M300 | * | * |
| Indexed Tb | * | * |
| Indexed Eb | * | * |
| Indexed tan δ (0° C.) | * | * |
| Indexed tan δ (30° C.) | * | * |
| Indexed E' (30° C.) | * | * |
| Indexed tan δ (60° C.) | * | * |
| RPA viscosity | 55.2 | 48.8 |
| Indexed viscosity | 1.00 | 0.88 |
| Indexed ML | 1.00 | 1.00 |
| Indexed MH | 1.00 | 0.44 |
| Indexed MH − ML | 1.00 | 0.72 |

* Measurement not obtained

As can be seen from the data of Table 1C, the addition of 10 phr whey protein to the titanium dioxide filler-containing rubber composition of Example 2 results in a decrease in viscosity as compared to the composition of control Example 1 (which contained the same amount of titanium dioxide filler but 0 phr of whey protein). Furthermore, the use of whey protein in combination with titanium dioxide modifies the cross-linking present in the rubber composition as illustrated by the reduced MH−ML values for Example 2.

Examples 3-8

In Examples 3-8, additional rubber compositions containing titanium dioxide filler were prepared using a combination of natural rubber and polybutadiene for the rubber component. Examples 3 and 4 utilize a combination of 5 phr of carbon black and 45 phr of titanium dioxide with Example 4 adding whey protein. Example 3 is the control for Example 4. Examples 5 and 6 utilize 50 phr of titanium dioxide with Example 6 adding whey protein. Example 5 is the control for Example 6. Examples 7 and 8 utilize 45 phr of titanium dioxide with 5 phr of silica with Example 8 adding whey protein. Example 7 is the control for Example 8. The rubber compositions were prepared in a two stage mixing process (i.e., one masterbatch stage and a final batch stage) according to the formulations shown in Table 2A. The amount of each ingredient used is reported as parts per hundred rubber (phr). The mixing process used for these formulations is as provided in Table 1B above. The whey protein component utilized in Examples 4, 6 and 8 was acid whey (containing approximately 12 weight % protein).

TABLE 2A

Rubber Formulations For Examples 3-8

| Sample # | 3 | 4 | 5 | 6 | 7 | 8 |
|---|---|---|---|---|---|---|
| Master-Batch #1 | | | | | | |
| Natural rubber | 80 | 80 | 80 | 80 | 80 | 80 |
| Polybutadiene[1] | 20 | 20 | 20 | 20 | 20 | 20 |
| Titanium dioxide[2] | 45 | 45 | 50 | 50 | 45 | 45 |
| Carbon Black[3] | 5 | 5 | 0 | 0 | 0 | 0 |
| Silica[4] | 0 | 0 | 0 | 0 | 5 | 5 |
| Whey protein component (acid whey) | 0 | 10 | 0 | 10 | 0 | 10 |
| Whey protein (from WPC) | 0 | 0.6 | 0 | 0.6 | 0 | 0.6 |
| Processing oil | 15 | 15 | 15 | 15 | 15 | 15 |
| Antioxidants | 2.95 | 2.95 | 2.95 | 2.95 | 2.95 | 2.95 |
| Stearic acid | 2 | 2 | 2 | 2 | 2 | 2 |
| Final Batch | | | | | | |
| Vulcanization activator (Zinc oxide) | 2.5 | 2.5 | 2.5 | 2.5 | 2.5 | 2.5 |
| Vulcanizing agent (sulfur) | 1.5 | 1.5 | 1.5 | 1.5 | 1.5 | 1.5 |
| Vulcanization accelerators | 1.3 | 1.3 | 1.3 | 1.3 | 1.3 | 1.3 |

[1]High-cis polybutadiene (cis-bond content 96%)
[2]Kronos ® 1000, titanium dioxide particles obtained from Kronos, Inc. (oil absorption 20 grams/100 gram)
[3]N234 carbon black
[4]commercially available silica filler having a surface area ($N_2SA$) of about 190-210 $m^2/g$ After curing, each of the rubber compositions was tested for various properties according to the procedures described above for Examples 1 and 2 (with the exception of viscosity data and rheometry data which was determined on uncured samples). Results are reported in Table 2B below. The index values listed in Table 2B were determined by comparing the value for the formulation according to the present disclosure with the respective value for the control (i.e., dividing the test value by the control value).

TABLE 2B

Testing Results for Rubber Formulations of Examples 3-8

| Property | 3 | 4 | 5 | 6 | 7 | 8 |
|---|---|---|---|---|---|---|
| Indexed M300 | 1.00 | 0.63 | * | * | 1.00 | 0.71 |
| Indexed Tb | 1.00 | 0.47 | * | * | 1.00 | 0.48 |
| Indexed Eb | 1.00 | 0.96 | * | * | 1.00 | 0.88 |
| Indexed tan δ 0° C | 1.00 | 1.04 | 1.00 | 1.05 | 1.00 | 1.03 |
| Indexed tan δ 30° C | 1.00 | 1.27 | 1.00 | 1.51 | 1.00 | 1.31 |
| Indexed E' 30° C | 1.00 | 0.91 | 1.00 | 0.86 | 1.00 | 0.93 |
| Indexed tan δ 60° C | 1.00 | 1.70 | 1.00 | 2.44 | 1.00 | 1.49 |
| RPA viscosity | 42.4 | 42.5 | 42.9 | 40.3 | 47.1 | 43.9 |
| Indexed viscosity | 1.00 | 1.00 | 1.00 | 0.94 | 1.00 | 0.93 |

TABLE 2B-continued

Testing Results for Rubber Formulations of Examples 3-8

| Property | 3 | 4 | 5 | 6 | 7 | 8 |
|---|---|---|---|---|---|---|
| Indexed ML | 1.00 | 1.20 | 1.00 | 1.06 | 1.00 | 1.02 |
| Indexed MH | 1.00 | 0.58 | 1.00 | 0.59 | 1.00 | 0.62 |
| Indexed MH-ML | 1.00 | 0.50 | 1.00 | 0.52 | 1.00 | 0.56 |

* Measurement not obtained

As can be seen from Table 2B, the use of whey protein in combination with titanium dioxide filler resulted in a reduction in viscosity in the compounds of Examples 6 and 8. Furthermore, the use of whey protein (in combination with titanium dioxide filler) modifies the cross-linking present in the rubber composition as illustrated by the reduced M–ML values for Examples 4, 6 and 8.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for modifying the cross-linking of a titanium oxide filler-containing rubber composition, the method comprising
mixing ingredients comprising
a whey protein powder component in an amount sufficient to provide about 0.1 to about 10 phr of whey protein,
at least one rubber,
about 5 to about 200 phr of titanium oxide filler,
an amount of reinforcing silica filler of no more than 5 phr, and
a cure package,
wherein the rubber composition exhibits decreased cross-linking as measured by $M_H$-$M_L$ of at least 10% as compared to a comparative rubber composition of the same ingredients except for lacking any whey protein and
wherein the mixing includes at least one non-productive master-batch stage conducted at a temperature of about 130 to about 200° C. during which the at least one rubber is added and the whey protein powder component is added as a powder.

2. The method of claim 1, wherein the whey protein powder component is present in an amount sufficient to provide about 0.5 to about 5 phr of whey protein.

3. The method of claim 1, wherein the ingredients further comprise at least one filler selected from: calcium carbonate, clay, talc, mica, wollastonite, diatomite, and barite.

4. The method of claim 1, wherein the ingredients are free of carbon black filler.

5. The method of claim 1, wherein a majority of the protein chains in the whey protein have a molecular weight of greater than about 10 kDaltons.

6. The method of claim 1, wherein at least a majority by weight of the at least one rubber comprises at least one of: natural rubber, polyisoprene rubber, polybutadiene rubber, and styrene-butadiene rubber.

7. The method of claim 6, wherein the titanium oxide filler comprises titanium dioxide.

8. The method of claim 1, wherein the whey protein powder component comprises acid whey.

9. The method of claim 1, wherein the whey protein powder component comprises whey protein concentrate.

10. The method of claim 1, wherein the whey protein powder component comprises whey protein isolate.

11. A method for preparing a tire rubber composition, the method comprising
mixing ingredients comprising
a whey protein powder component in an amount sufficient to provide 0.1 to 10 phr of whey protein, at least one rubber comprising a conjugated diene monomer-containing polymer or copolymer, 5 to 200 phr of titanium oxide filler, an amount of reinforcing silica filler of no more than 5 phr, and a cure package, wherein the mixing includes at least one non-productive master-batch stage conducted at a temperature of about 130 to about 200° C. during which the at least one rubber is added and the whey protein powder component is added as a powder.

12. The method of claim 11, wherein mixing the ingredients further comprises a final productive mixing stage conducted at a temperature between 40 and 120° C.

13. The method of claim 11, wherein mixing the ingredients comprises kneading with a mixer or with a milled roll.

14. The method of claim 11, wherein the whey protein powder component is present in an amount sufficient to provide about 0.5 to about 5 phr of whey protein.

15. The method of claim 11, wherein the ingredients further comprise at least one filler selected from: calcium carbonate, clay, talc, mica, wollastonite, diatomite, and barite.

16. The method of claim 11, wherein the ingredients are free of carbon black filler.

17. The method of claim 11, wherein a majority of the protein chains in the whey protein have a molecular weight of greater than about 10 kDaltons.

18. The method of claim 11, wherein at least a majority by weight of the at least one rubber comprises at least one of: natural rubber, polyisoprene rubber, polybutadiene rubber, and styrene-butadiene rubber.

19. The method of claim 11, wherein the titanium oxide filler comprises titanium dioxide.

20. The method of claim 11, wherein the whey protein powder component comprises acid whey.

21. The method of claim 11, wherein the whey protein powder component comprises whey protein concentrate.

22. The method of claim 11, wherein the whey protein powder component comprises whey protein isolate.

* * * * *